US012055280B2

(12) United States Patent
Wada et al.

(10) Patent No.: US 12,055,280 B2

(45) Date of Patent: Aug. 6, 2024

(54) LIGHT-GUIDING BODY FIXATION STRUCTURE AND VEHICLE LAMP

(71) Applicant: Ichikoh Industries, Ltd., Isehara (JP)

(72) Inventors: Seito Wada, Isehara (JP); Shintaro Abe, Isehara (JP)

(73) Assignee: ICHIKOH INDUSTRIES, LTD., Isehara (JP)

( * ) Notice: Subject to any disclaimer, the term of this patent is extended or adjusted under 35 U.S.C. 154(b) by 0 days.

(21) Appl. No.: 18/255,328

(22) PCT Filed: Dec. 1, 2021

(86) PCT No.: PCT/JP2021/044120
§ 371 (c)(1),
(2) Date: May 31, 2023

(87) PCT Pub. No.: WO2022/118892
PCT Pub. Date: Jun. 9, 2022

(65) Prior Publication Data

US 2024/0093849 A1 Mar. 21, 2024

(30) Foreign Application Priority Data

Dec. 1, 2020 (JP) ................................ 2020-199743
Nov. 30, 2021 (JP) ................................ 2021-194721

(51) Int. Cl.
*F21S 41/29* (2018.01)
*F21S 41/19* (2018.01)
*F21S 41/24* (2018.01)

(52) U.S. Cl.
CPC ............... *F21S 41/24* (2018.01); *F21S 41/19* (2018.01); *F21S 41/29* (2018.01)

(58) Field of Classification Search
CPC .. F21S 41/19; F21S 41/29; F21S 41/24; F21S 43/195; F21S 43/19; F21S 43/27;
(Continued)

(56) References Cited

FOREIGN PATENT DOCUMENTS

AT 516170 B1 * 3/2016 ........... B60Q 1/0011
CN 205991415 U 3/2017
(Continued)

OTHER PUBLICATIONS

Search English translation of AT-516170-B1 (Year: 2016).*
(Continued)

*Primary Examiner* — Omar Rojas Cadima
(74) *Attorney, Agent, or Firm* — Oblon, McClelland, Maier & Neustadt, L.L.P.

(57) ABSTRACT

To prevent point illumination and fix a light-guiding body. The present invention includes: a fixation portion having a first holding portion and a second holding portion; engagement portions that restrict frontward movement of the one end portion in the front-back direction; an elastic portion that generates elastic force upward in the up-down direction, and abuts on the one end portion to maintain engagement of the engagement portions; contact portions that bring the first holding portion and the one end portion into contact with each other on both sides in the left-right direction; an abutment portion that abuts on the one end portion to restrict backward movement of the one end portion in the front-back direction; and a restriction portion that abuts on the elastic portion to restrict downward movement of the elastic portion in the up-down direction.

5 Claims, 13 Drawing Sheets

(58) Field of Classification Search
CPC .............. F21S 43/237; F21W 2103/00; F21W 2102/00; F21V 17/10; F21V 15/01; F21Y 2115/10
See application file for complete search history.

(56) References Cited

FOREIGN PATENT DOCUMENTS

| | | | | | |
|---|---|---|---|---|---|
| CN | 203771297 | U | | 8/2018 | |
| CN | 110285383 | A | * | 9/2019 | |
| CN | 110285383 | A | | 9/2019 | |
| DE | 20 2006 003 392 | U1 | | 6/2006 | |
| DE | 202006003392 | U1 | * | 6/2006 | ........... B60Q 1/2665 |
| EP | 2 775 197 | A1 | | 9/2014 | |
| EP | 2 977 672 | A1 | | 1/2016 | |
| JP | 2015-18611 | A | | 1/2015 | |
| JP | 2019-145327 | A | | 8/2019 | |

OTHER PUBLICATIONS

Search English translation of DE-202006003392-U1 (Year: 2006).*
Search English translation of CN-110285383-A (Year: 2019).*
International Search Report issued on Dec. 28, 2021 in PCT/JP2021/044120, filed on Dec. 1, 2021, 2 pages.
Supplementary European Search Report issued in European Patent Application No. 21900643.4 on May 14, 2024.

* cited by examiner

LIGHT-GUIDING BODY FIXATION STRUCTURE AND VEHICLE LAMP

TECHNICAL FIELD

The present invention relates to a light-guiding body fixation structure and a vehicle lamp.

BACKGROUND ART

For example, PTL 1 indicates a structure in which an extension portion that extends outward from an outer edge of a light-guiding body is provided and this extension portion is fixed to a portion away from the light-guiding body by screws or other screw fixation.

In addition, PTL 2 indicates a structure in which a light-guiding body has a light emitting portion on the front side, an extension portion that extends from the upper side to the back side is provided, the extension portion is continuously provided at least over an area corresponding to a light emitting portion, and a holding portion that holds a part of the light-guiding body has a groove into which the extension portion is inserted.

CITATION LIST

Patent Literature

PTL 1: Japanese Patent Laid-open No. 2015-18611
PTL 2: Japanese Patent Laid-open No. 2019-145327

SUMMARY OF THE INVENTION

Problems to be Solved by the Invention

The structure in which the extension portion that extends from the light-guiding body is fixed by screw fixation, as in PTL 1, can provide sufficient fixation, but may cause point illumination in which light leaking from the light-guiding body and directed to the extension portion shines more strongly than in the surrounding area. On the other hand, in PTL 2, the extension portion is provided so as to extend to the back side of the light-guiding body in order to prevent point illumination, but may not be able to be sufficiently fixed against vehicle vibration or the like because of the structure in which the extension portion is inserted into the groove of the holding portion. As a fixation structure, a lance structure in which an inserted member is engaged and held with a claw is generally known, but may not be able to be sufficiently fixed against vehicle vibration, or the like.

The present invention has been made in view of the above, and an object of the present invention is to provide a light-guiding body fixation structure and a vehicle lamp in which point illumination can be prevented and a light-guiding body can be fixed.

Means for Solving the Problem

In order to achieve the above object, a light-guiding body fixation structure of an aspect of the present invention includes: a fixation portion that has a first holding portion holding one end portion of a continuous light-guiding body, and a second holding portion holding the other end portion of the light-guiding body; engagement portions that restrict movement of the one end portion to one side in a first direction by mutual engagement between the first holding portion and the one end portion; an elastic portion that generates elastic force to one side in a second direction which intersects the first direction, and that abuts on the one end portion to maintain engagement of the engagement portions; contact portions that bring the first holding portion and the one end portion into contact with each other on both sides in a third direction which intersects the first direction and the second direction in an engagement state of the engagement portions; an abutment portion that abuts on the one end portion to restrict movement of the one end portion to the other side in the first direction; and a restriction portion that abuts on the elastic portion to restrict movement of the elastic portion to the other side in the second direction.

The light-guiding body may have a protrusion partially on a second side surface opposite to a first side surface which emits light, and the fixation portion may have a recess into which the protrusion is inserted.

The second holding portion may be formed by a hole portion into which the other end portion of the light-guiding body is inserted and fitted.

The abutment portion may be a base plate mounted with a light source that causes light to be incident from the one end portion of the light-guiding body.

A vehicle lamp of an aspect of the present invention includes: a light-guiding body that is continuous between one end portion and the other end portion; a light source that causes light to be incident from the one end portion of the light-guiding body; and a fixation portion to which the light-guiding body and the light source are attached, wherein the light-guiding body is fixed to the fixation portion by the above light-guiding body fixation structure.

Effect of the Invention

According to the present invention, it is possible to provide a light-guiding body fixation structure and a vehicle lamp in which point illumination can be prevented and a light-guiding body can be fixed.

MODE FOR CARRYING OUT THE INVENTION

Hereinafter, an embodiment according to the present invention will be described with reference to the drawings. The present invention is not limited by this embodiment. In addition, components in the following embodiment include those that can be easily replaced by those skilled in the art, or those that are substantially identical.

Figure 1:
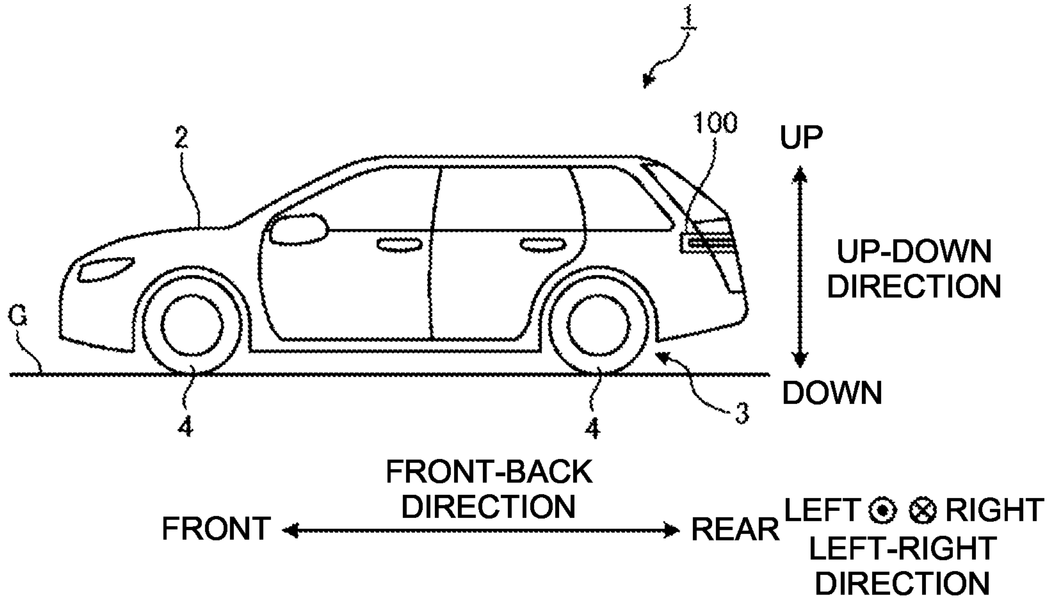
FIG. 1 is a side view illustrating an example of a vehicle equipped with a vehicle lamp of an embodiment.

FIG. 1 is a side view illustrating an example of a vehicle 1 equipped with a vehicle lamp 100 of an embodiment.

As illustrated in FIG. 1, the vehicle 1 includes a vehicle body 2, a traveling device 3, and the vehicle lamp 100. The vehicle body 2 has a driver's cab where a driver boards. The vehicle body 2 is supported on the traveling device 3. The traveling device 3 has wheels on which tires 4 are mounted, a steering device for changing the traveling direction of the vehicle 1, and a braking device for slowing down or stopping the traveling device 3. The vehicle 1 of the embodiment includes a getting-on/off-doors provided at lateral portions of the vehicle body 2 and a back door provided at a rear portion of the vehicle body 2. Each of the getting-on/off-doors and the back door is movably supported by the vehicle body 2 via a hinge mechanism.

In the following description, assuming that the vehicle 1 is disposed on the ground G parallel to a horizontal plane, and the positional relationship of each portion will be described using terms, namely, a front, a back, a top, a bottom, a left, and a right with a driver in the driver's cab as a reference. The front/back, up/down, left/right directions are the directions in the vehicle-mounted state when the vehicle lamp is mounted on the vehicle, and the directions viewed from the driver's seat in the direction the vehicle travels. The left-right direction is also referred to as the width direction. In the following description, the front-back direction is also referred to as the first direction, in which the front side is one in the first direction and the back side is the other in the first direction. The vertical direction is also referred to as the second direction that intersects (orthogonal to) the first direction, in which the upper side is one in the second direction and the lower side is the other in the second direction. The left-right direction is also referred to as the third direction, which intersects (orthogonal to) the first and second directions, in which the right side is one in the third direction and the left side is the other in the third direction.

Figure 2:
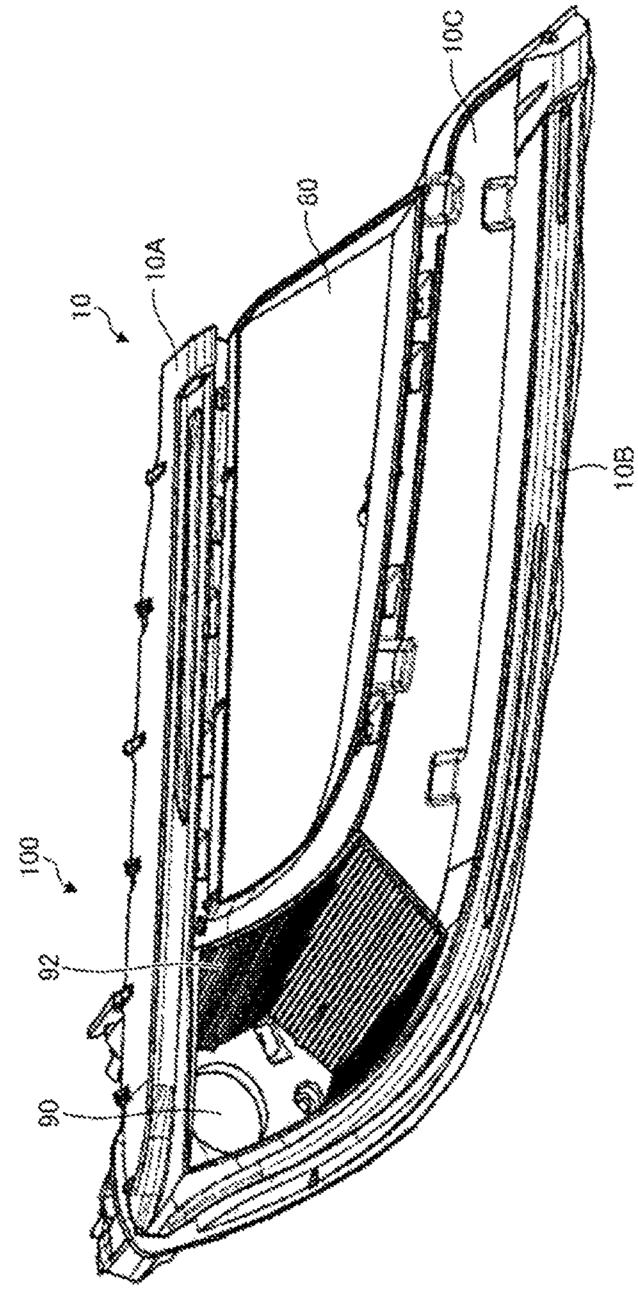
FIG. 2 is a front view of a housing that constitutes the vehicle lamp of the embodiment.
Figure 3:
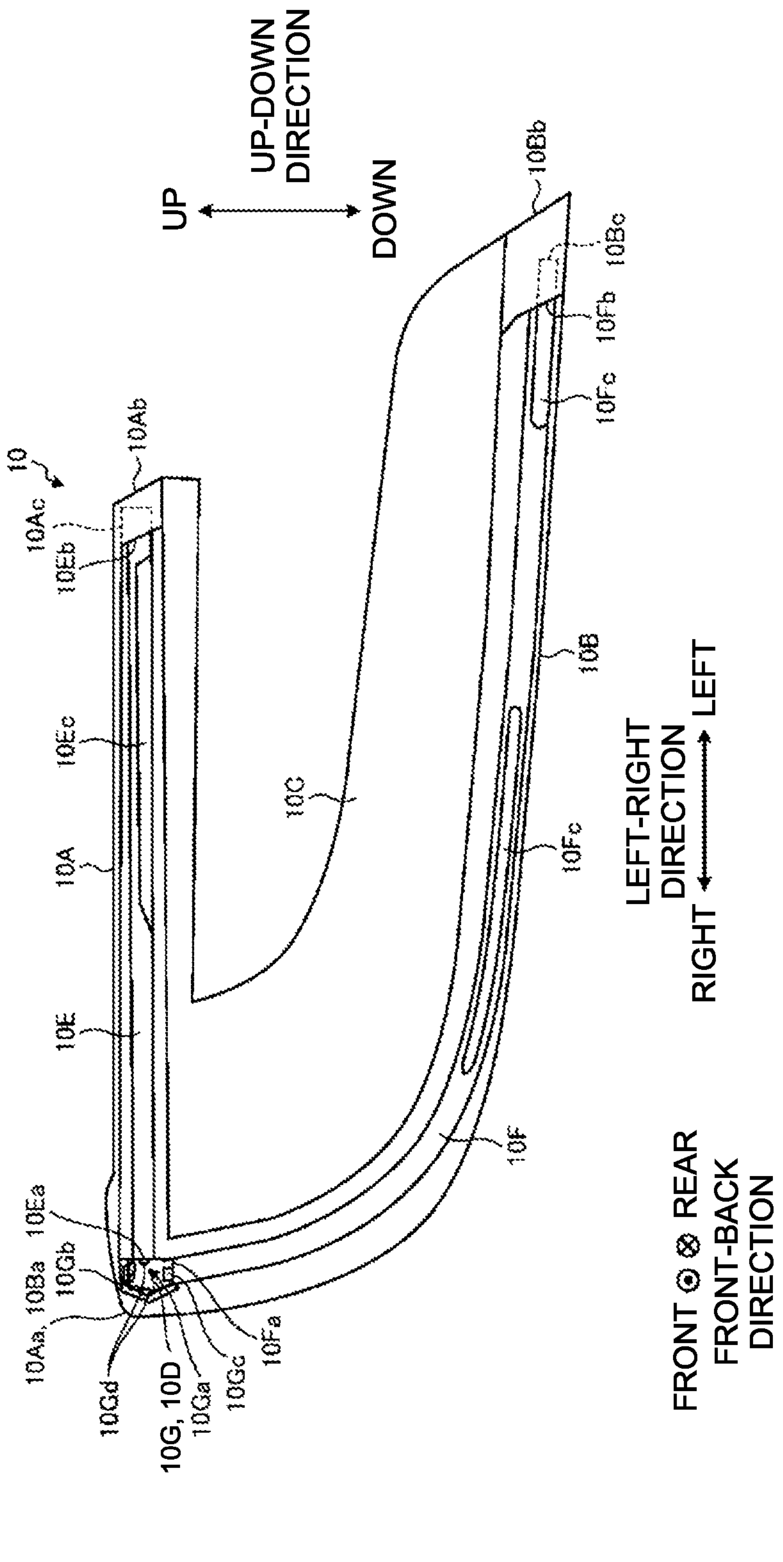
FIG. 3 is a schematic diagram of the front of the housing that constitutes the vehicle lamp of the embodiment.
Figure 4:
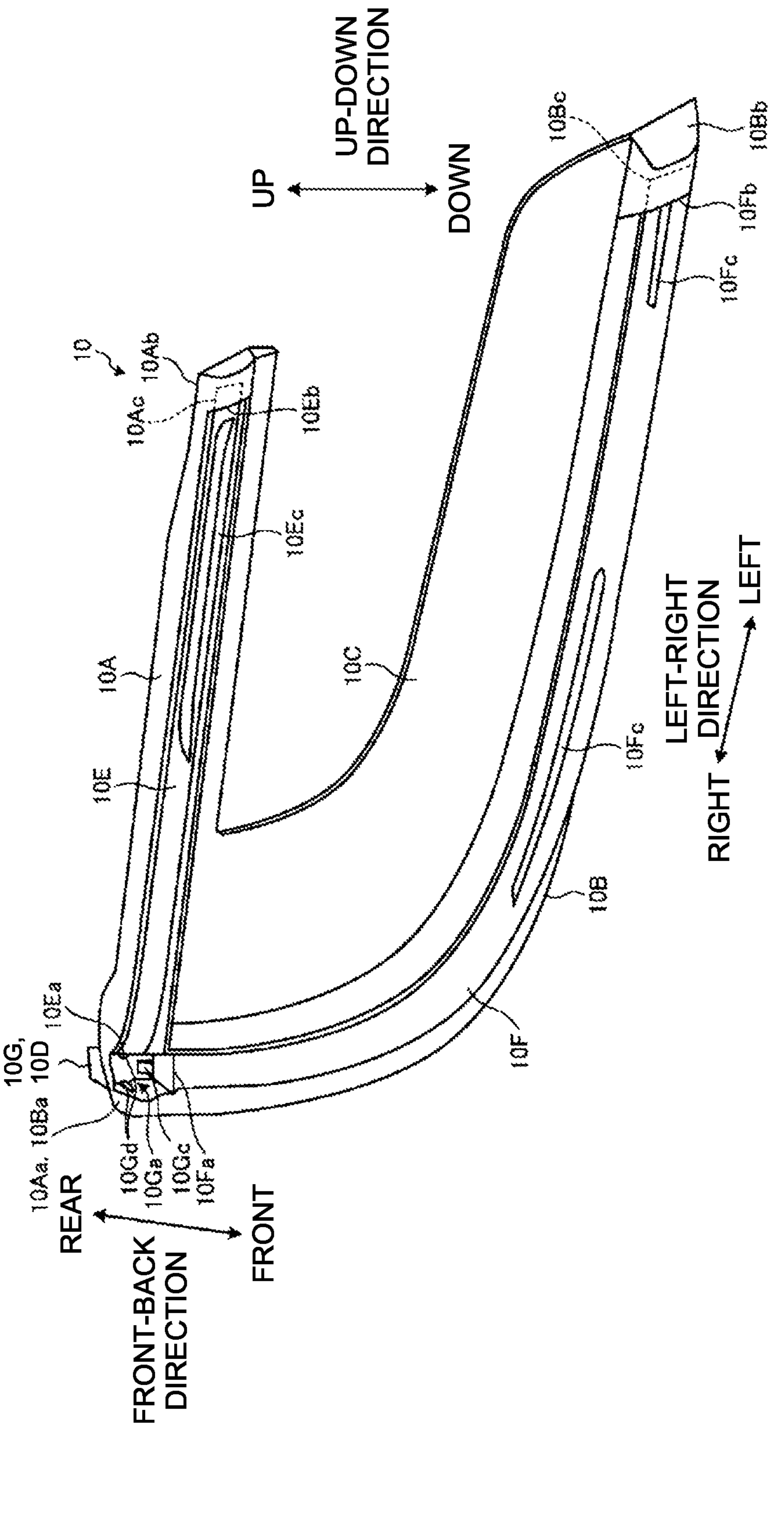
FIG. 4 is a perspective view of the housing viewed from the front.
Figure 5:
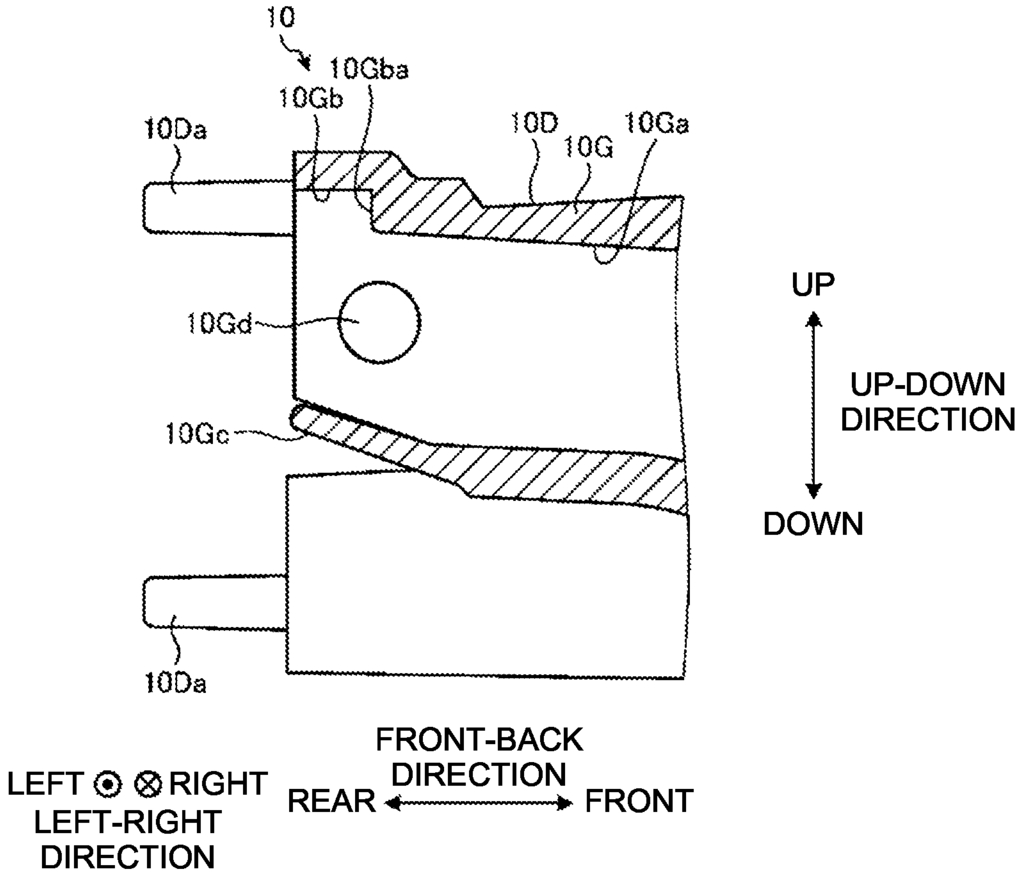
FIG. 5 is a partially enlarged cross-sectional view of the housing.
Figure 6:
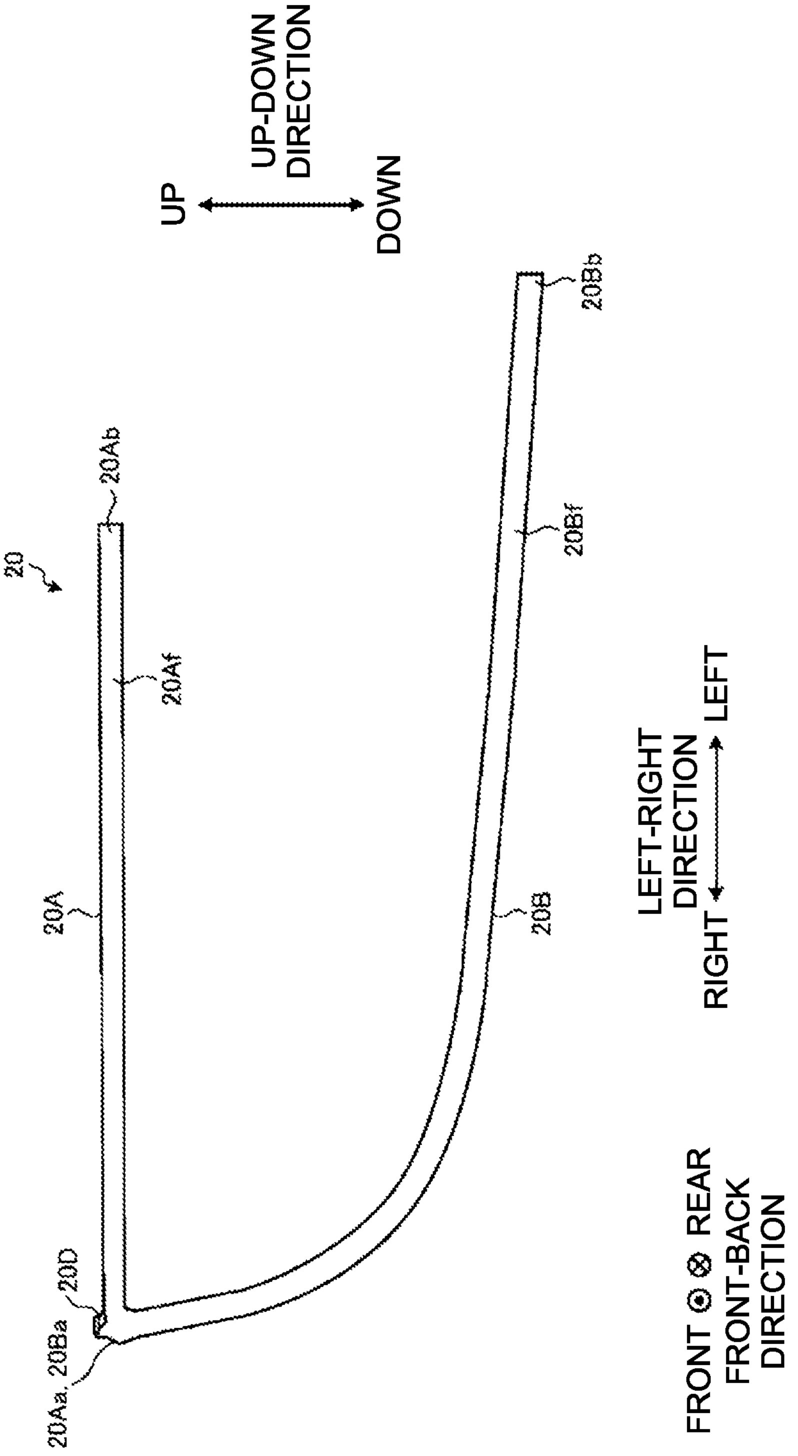
FIG. 6 is a front view of a light-guiding body that constitutes the vehicle lamp of the embodiment.
Figure 7:
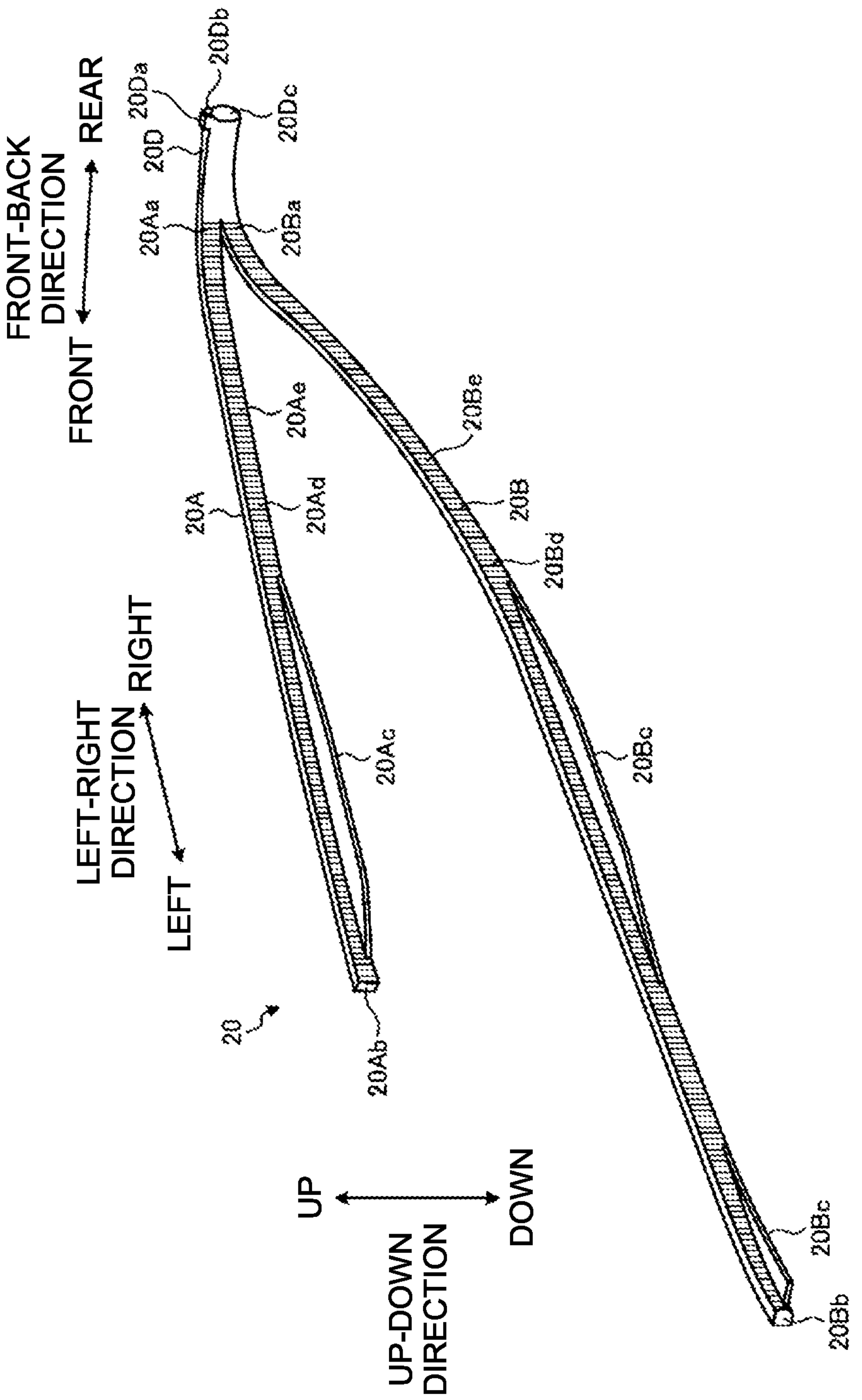
FIG. 7 is a perspective view of the light-guiding body viewed from the back.
Figure 8:
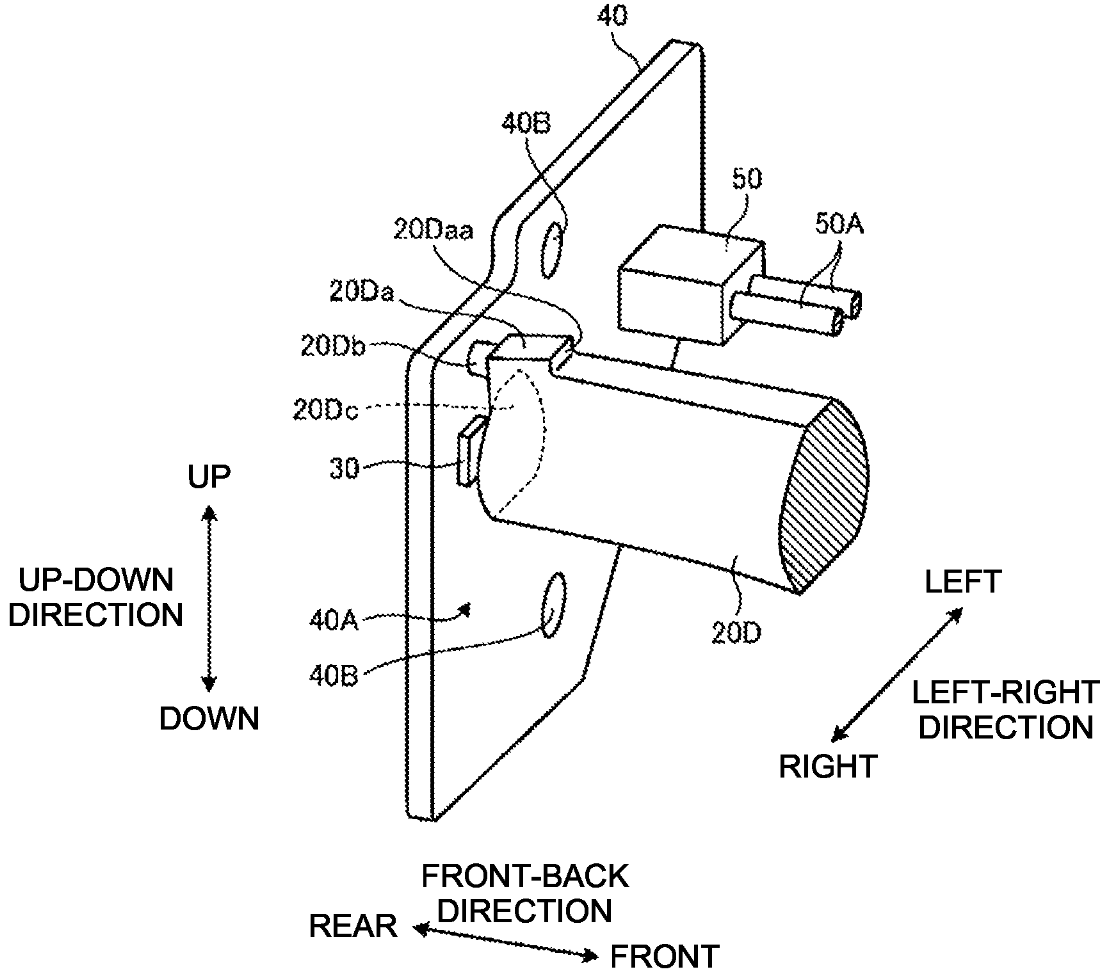
FIG. 8 is a partially enlarged perspective view of the light-guiding body.

FIG. 2 is a front view of a housing that constitutes the vehicle lamp of the embodiment. FIG. 3 is a schematic diagram of the front of the housing that constitutes the vehicle lamp of the embodiment. FIG. 4 is a perspective view of the housing viewed from the front. FIG. 5 is a partially enlarged cross-sectional view of the housing. FIG. 6 is a front view of a light-guiding body that constitutes the vehicle lamp of the embodiment. FIG. 7 is a perspective view of the light-guiding body viewed from the back. FIG. 8 is a partially enlarged perspective view of the light-guiding body.

In the embodiment, the vehicle lamp 100 is provided on each of the left and right sides of the rear portion of the vehicle 1. Each vehicle lamp 100 is, for example, a rear lamp (rear combination lamp) provided in the rear portion of the vehicle body 2, that is, a lamp that includes a plurality of functional lamps disposed at the rear portion of the vehicle body 2. For example, the vehicle lamp 100 is a combination of three of the following lamps: a clearance lamp, a turn signal lamp, a daytime running lamp, a tail lamp, and a stop lamp. The vehicle lamps 100 are not limited to this, and may be other types of lamps such as headlamps, daylight lamps, clearance lamps, turn signal lamps, daytime running lamps, tail lamps, and stop lamps. The vehicle lamps 100 of the embodiment are disposed across the back door of the vehicle body 2. A structure of the vehicle lamp 100 provided on the left side of the rear portion of the vehicle body 2 and a structure of the vehicle lamp 100 provided on the right side of the rear portion of the vehicle body 2 are symmetrical in the left-right direction and are substantially the same. The following description will focus mainly on the vehicle lamp 100 provided on the right side of the front portion of the vehicle body 2, while the description of the vehicle lamp 100 provided on the left side of the front portion of the vehicle body 2 will be simplified or omitted.

The vehicle lamp 100 includes a housing 10, a light-guiding body 20, and a light source 30.

The housing 10 is a member that is disposed on the back side in the vehicle lamp 100. The housing 10 is made of a material that does not transmit light. The housing 10 compartments a plurality of lamp chambers, together with a front lamp lens (not illustrated). The plurality of lamp chambers are, for example, clearance lamps, turn signal lamps, daytime running lamps, tail lamps, stop lamps, and the like. The housing 10 is also referred to as a fixation portion that fixes the light-guiding body 20.

As illustrated in FIG. 1, FIG. 2, and FIG. 3, the housing 10 has an upper portion 10A, a lower portion 10B, a central portion 10C, a rear portion 10D, and an inner housing 80. The upper portion 10A is formed so as to extend in the left-right direction, viewed from the front. The lower portion 10B is formed so as to curve to the left while extending downward from a right end 10Aa of an upper portion 10A, and to extend to the left, viewed from the front. The lower portion 10B is formed such that a right end 10Ba is connected to the right end 10Aa of the upper portion 10A. The central portion 10C is formed so as to connect the upper portion 10A and the lower portion 10B. The rear portion 10D is formed so as to extend backward from the mutual right ends 10Aa and 10Ba where the upper portion 10A and the lower portion 10B connect. The inner housing 80 is disposed between the upper portion 10A and the lower portion 10B of the housing 10, on the upper portion 10A side with respect to the central portion 10C. The inner housing 80 has a light source and other components disposed therein and is sectioned as a lamp chamber different from the housing 10. The inner housing 80 serves as a light chamber for a fog lamp, a tail lamp, a backup lamp, or the like.

The upper portion 10A is open to the front and has an upper groove 10E that extends in the left-right direction. The upper groove 10E is formed such that a right end 10Ea curves backward toward the rear portion 10D at the right end 10Aa of the upper portion 10A. The upper groove 10E is formed such that a left end 10Eb terminates at a left end 10Ab of the upper portion 10A. The left end 10Ab of the upper portion 10A is formed with a hole portion 10Ac that communicates with the left end 10Eb of the upper groove 10E. The hole portion 10Ac extends in the left-right direction, and is open on the right side toward the left end 10Eb of the upper groove 10E and closed on the left side. The hole portion 10Ac is also referred to as a second holding portion. The upper groove 10E is formed with a recess 10Ec that is recessed backward and extends in the left-right direction, near the left end 10Eb in the middle of the extension.

The lower portion 10B is formed with a lower groove 10F that is open to the front and extends in the left-right direction. The lower groove 10F is formed with a right end 10Fa that curves backward toward the rear portion 10D at the right end 10Ba of the lower portion 10B. The lower groove 10F is formed with a left end 10Fb that terminates at a left end 10Bb of the lower portion 10B. The left end 10Bb of the lower portion 10B is formed with a hole portion 10Bc that communicates with the left end 10Fb of the lower groove 10F. The hole portion 10Bc extends in the left-right direction, and is open on the right side toward the left end 10Fb of the lower groove 10F and closed on the left side. The hole portion 10Bc is also referred to as the second holding portion. The lower groove 10F is formed with a recess 10Fc that is recessed backward and extends in the left-right direction, in the middle of the extension and at the left end 10Eb.

The central portion 10C constitutes a rear wall plate of the lamp chamber that is partitioned by the housing 10. In the central portion 10C, for example, a tail lamp, a stop lamp, a turn signal lamp, or the like is disposed. In the central portion 10C, a hole 90 for disposing a light source is formed. In the central portion 10C, a reflector 92 and the like that reflect light from the light source disposed in the central portion 10C is disposed.

In the rear portion 10D, a cylinder 10G having a hole 10Ga that penetrates in the front-back direction is formed. The cylinder 10G is also referred to as the first holding portion. In the cylinder 10G, the right end 10Ea of the upper groove 10E formed in the upper portion 10A and the right end 10Fa of the lower groove 10F formed in the lower portion 10B are communicated on the front side of the hole 10Ga. The cylinder 10G has inner wall surfaces on the top, bottom, left and right of the hole 10Ga. As illustrated in FIG. 5, the cylinder 10G is formed with an engagement recess 10Gb stepped and recessed toward the upper side to have a locking surface 10Gba facing the back side, at a rear end portion on the upper inner wall surface of the hole 10Ga. The cylinder 10G is formed with a plate-like elastic portion 10Gc that extends diagonally backward and upward and can bend in the vertical direction, at the rear end portion below the engagement recess 10Gb. The cylinder 10G is formed with respective projections 10Gd that project from the right and left inner wall surfaces. The projections 10Gd are provided so as to face each other in the left-right direction. The projections 10Gd are also referred to as contact portions. In the rear portion 10D, a plurality of pins 10Da extending backward in the form of rods are formed.

The light-guiding body 20 is also referred to as a light guide, and has an upper light-guiding portion 20A, a lower light-guiding portion 20B, and a rear light-guiding portion 20D, as illustrated in FIG. 6 and FIG. 7. The upper light-guiding portion 20A is formed so as to extend in the left-right direction as viewed from the front. The lower light-guiding portion 20B is formed so as to curve to the left while extending downward form a right end 20Aa of the upper light-guiding portion 20A and to extend to the left, viewed from the front. The lower light-guiding portion 20B is formed such that a right end 20Ba is connected to the right end 20Aa of the upper light-guiding portion 20A. The rear light-guiding portion 20D is formed so as to extend backward from the mutual right ends 20Aa and 20Ba where the upper light-guiding portion 20A and the lower light-guiding portion 20B connect.

The upper light-guiding portion 20A is formed so as to extend in the left-right direction in the form of a rod. The upper light-guiding portion 20A is formed such that the right end 20Aa curves backward toward the rear light-guiding portion 20D. The upper light-guiding portion 20A is formed such that a left end 20Ab can be inserted into the hole portion 10Ac formed in the left end 10Ab of the upper portion 10A. An outer shape of the left end 20Ab of the upper light-guiding portion 20A and an inner shape of the hole portion 10Ac are formed to be equivalent such that the left end 20Ab of the upper light-guiding portion 20A and the hole portion 10Ac are fitted to each other by insertion. The left end 20Ab of the upper light-guiding portion 20A is also referred to as the other end portion of the light-guiding body 20. The upper light-guiding portion 20A is formed with a protrusion 20Ac that projects toward the back side near the left end 20Ab in the middle of the extension. The protrusion 20Ac is partially formed in the middle of the extension of the upper light-guiding portion 20A. The protrusion 20Ac is formed so as to be able to be inserted into the recess 10Ec formed in the upper groove 10E of the upper portion 10A in the housing 10. An outer shape of the protrusion 20Ac and an inner shape of the recess 10Ec are formed to be equivalent such that the protrusion 20Ac of the upper light-guiding portion 20A and the recess 10Ec are fitted to each other by insertion. This upper light-guiding portion 20A is formed with a prism portion 20Ae on a rear surface 20Ad. The prism portion 20Ae reflects, toward a front surface 20Af of the upper light-guiding portion 20A, light guided into an inner portion of the upper light-guiding portion 20A. The front surface 20Af of the upper light-guiding portion 20A transmits and emits reflected light toward the front. The front surface 20Af of the upper light-guiding portion 20A is also referred to as a first side surface, and the rear surface 20Ad where the prism portion 20Ae is formed in opposition to the front surface 20Af is also referred to as the second side surface.

The lower light-guiding portion 20B is formed so as to extend in the left-right direction in the form of a rod. The lower light-guiding portion 20B is formed such that the right end 20Ba curves backward toward the rear light-guiding portion 20D. The lower light-guiding portion 20B is formed such that a left end 20Bb can be inserted into the hole portion 10Bc formed in the left end 10Bb of the lower portion 10B. An outer shape of the left end 20Bb of the lower light-guiding portion 20B and an inner shape of the hole portion 10Bc are formed to be equivalent such that the left end 20Bb of the lower light-guiding portion 20B and the hole portion 10Bc are fitted to each other by insertion. The left end 20Bb of the lower light-guiding portion 20B is also referred to as the other end portion of the light-guiding body 20. The lower light-guiding portion 20B is formed with a protrusion 20Bc that projects toward the back side near the left end 20Bb in the middle of the extension. The protrusion 20Bc is partially formed in the middle of the extension of the lower light-guiding portion 20B. The protrusion 20Bc is formed so as to be able to be inserted into the recess 10Fc formed in the lower groove 10F of the lower portion 10B in the housing 10. An outer shape of the protrusion 20Bc and an inner shape of the recess 10Fc are formed to be equivalent such that the protrusion 20Bc of the lower light-guiding portion 20B and the recess 10Fc are fitted to each other by insertion. This lower light-guiding portion 20B is formed with a prism portion 20Be on a rear surface 20Bd. The prism portion 20Be reflects, toward a front surface 20Bf of the lower light-guiding portion 20B, light guided into an inner portion of the lower light-guiding portion 20B. The front surface 20Bf of the lower light-guiding portion 20B transmits and emits reflected light toward the front. The front surface 20Bf of the lower light-guiding portion 20B is also referred to as the first side surface, and the rear surface 20Bd where the prism portion 20Be is formed in opposition to the front surface 20Bf is also referred to as the second side surface.

The rear light-guiding portion 20D is formed so as to extend in the front-back direction in the form of a rod. In the rear light-guiding portion 20D, the right end 20Aa of the upper light-guiding portion 20A, and the right end 20Ba of the lower light-guiding portion 20B are communicated on the front end side of the rear light-guiding portion 20D. The rear light-guiding portion 20D has outer peripheral surfaces on the top, bottom, left and right of an outer periphery of the rear light-guiding portion 20D. As illustrated in FIG. 8, the rear light-guiding portion 20D is formed with an engagement protrusion 20Da stepped and protruding toward the upper side to have a locking surface 20Daa facing the front side, at a rear end portion on the upper outer peripheral surface. The rear light-guiding portion 20D is formed with a protrusion portion 20Db that projects to a rear end portion of the rear light-guiding portion 20D on the back side of the engagement protrusion 20Da. This rear light-guiding portion 20D is inserted from the rear end into the cylinder 10G in the housing 10. The rear light-guiding portion 20D is also referred to as one end of the light-guiding body 20.

As illustrated in FIG. 8, the light source 30 is mounted on a plate surface 40A of a base plate 40. The base plate 40 is mounted with a connector 50 connected to wires 50A for energizing the light source 30. The light source 30 irradiates a rear surface 20Dc of the rear light-guiding portion 20D in the light-guiding body 20 with light. Therefore, in the light-guiding body 20, the rear surface 20Dc of the rear light-guiding portion 20D is disposed so as to face the light source 30. The rear surface 20Dc of the rear light-guiding portion 20D is also referred to as an incident surface. In the light-guiding body 20, when the rear surface 20Dc of the rear light-guiding portion 20D is disposed so as to face the light source 30, the protrusion portion 20Db is brought into contact with and abuts on the plate surface 40A of the base plate 40. The protrusion portion 20Db abuts on the plate surface 40A of the base plate 40, so that a distance between the rear surface 20Dc of the rear light-guiding portion 20D and the light source 30 is optimized. The base plate 40 is also referred to as an abutment portion. The base plate 40 is formed with a plurality of through holes 40B that penetrate the plate surface 40A. The pins 10Da formed in the cylinder 10G of the housing 10 are inserted into the through holes 40B. The pins 10Da are inserted into the through holes 40B, so that the base plate 40 is positioned in the cylinder 10G of the housing 10 (see FIG. 9).

Figure 9:
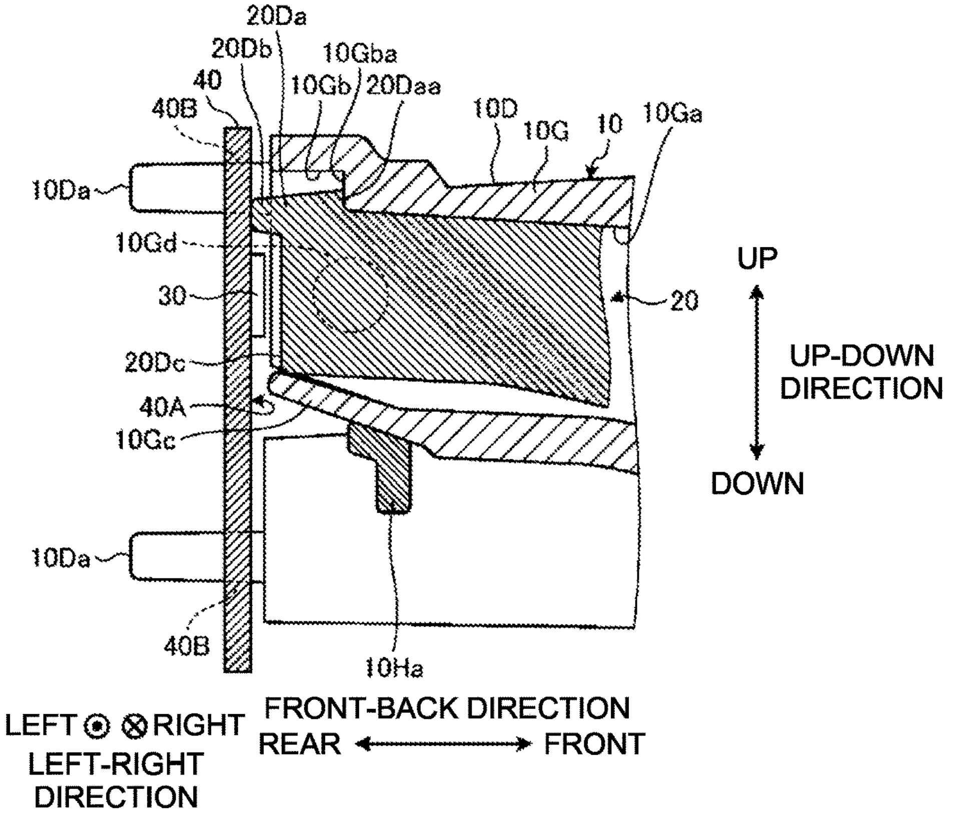
FIG. 9 is a partially enlarged cross-sectional view of an assembled state of the housing and the light-guiding body.
Figure 10:
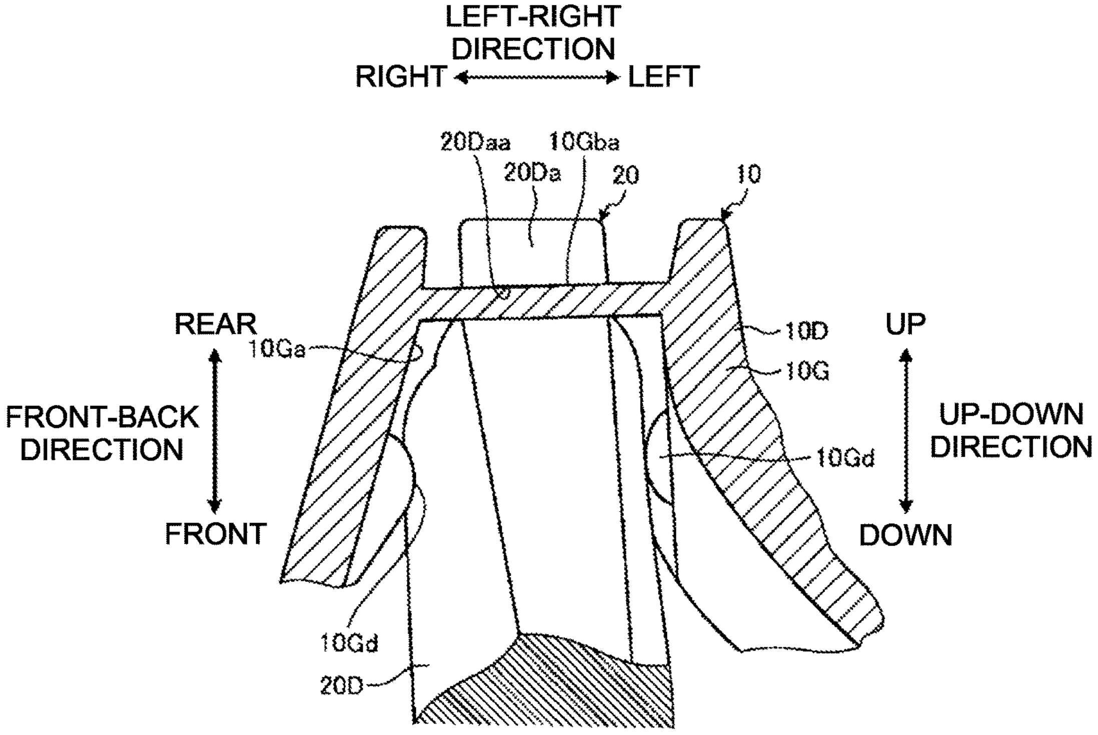
FIG. 10 is a partially enlarged perspective view of an assembled state of the housing and the light-guiding body, viewed from the front.
Figure 11:
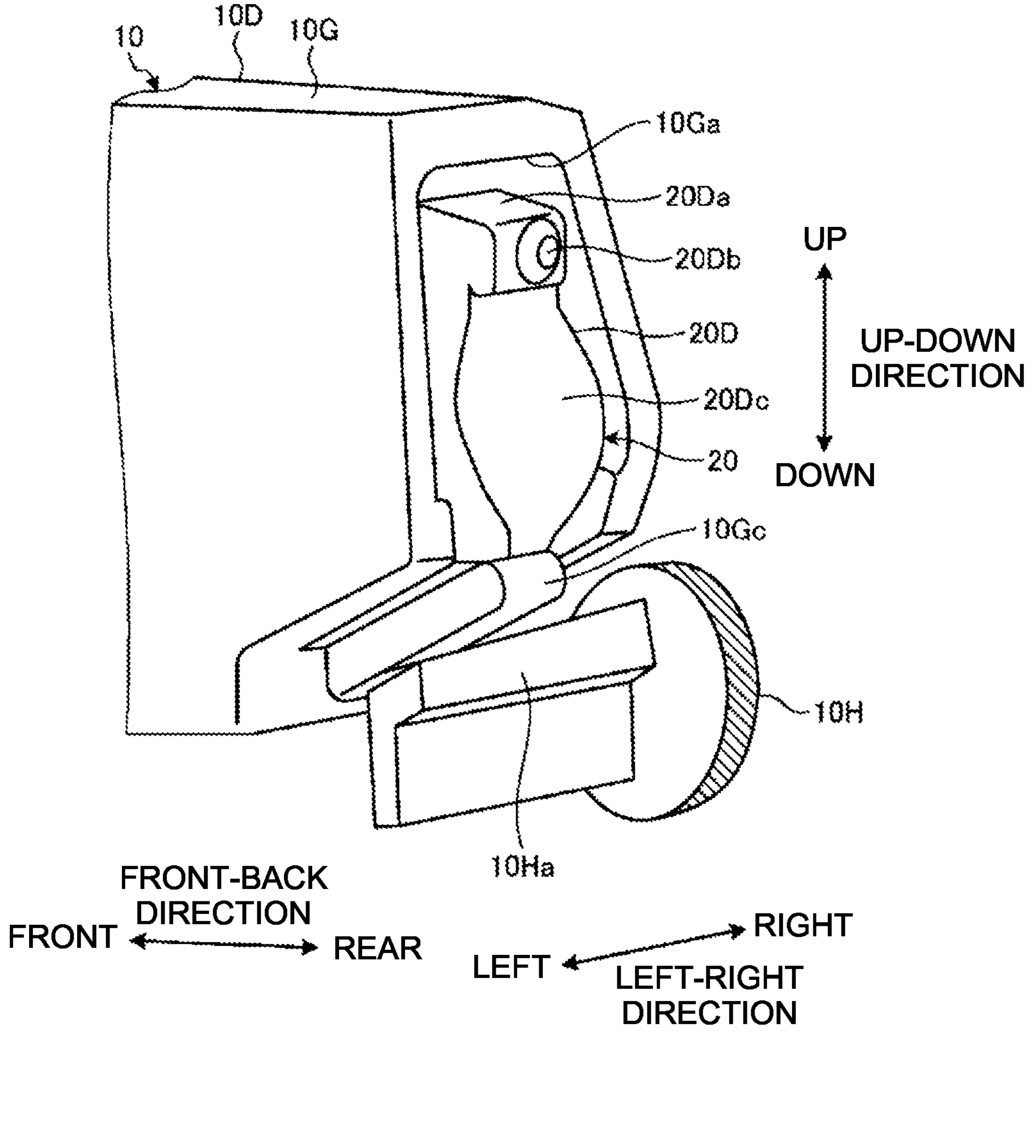
FIG. 11 is a partially enlarged perspective view of an assembled state of the housing and the light-guiding body, viewed from the back.
Figure 12:
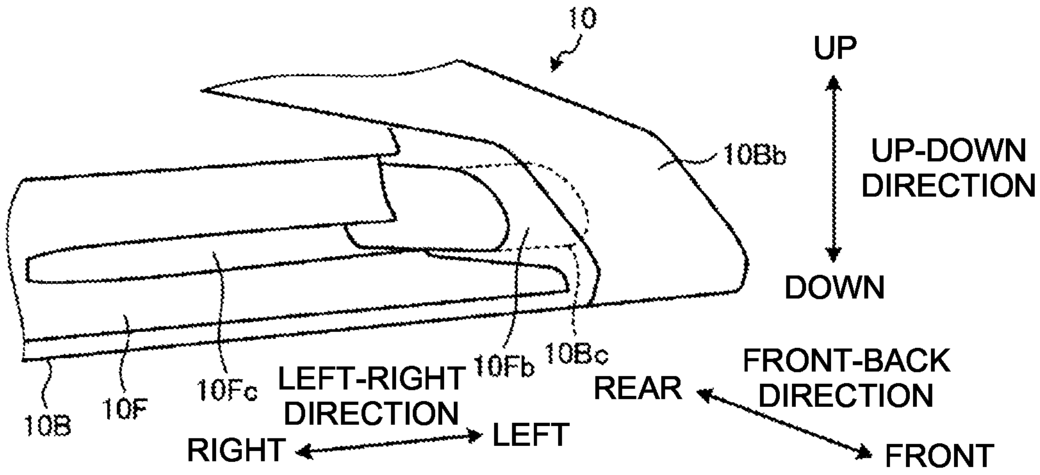
FIG. 12 is a partially enlarged perspective view of the housing viewed from the front.
Figure 13:
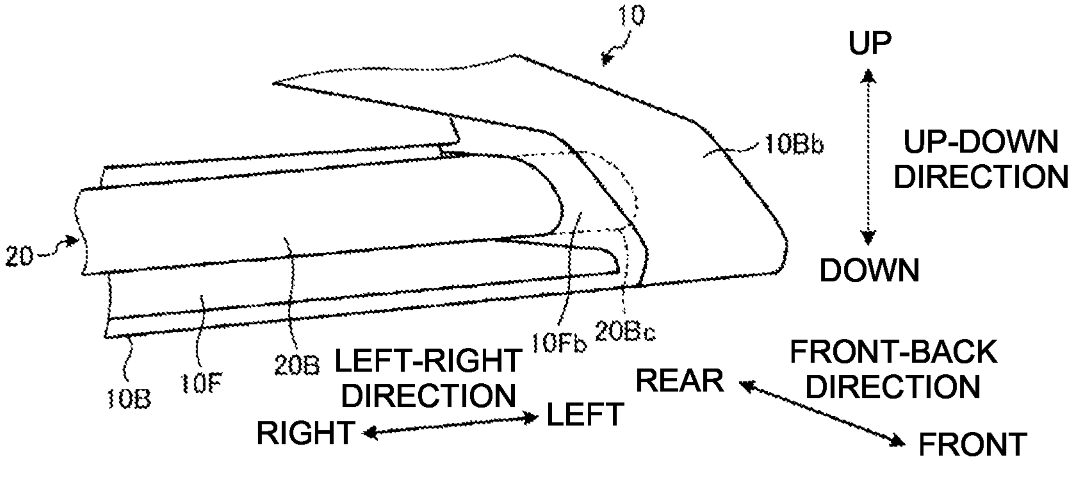
FIG. 13 is a partially enlarged perspective view of an assembled state of the housing and the light-guiding body, viewed from the front.
Figure 14:
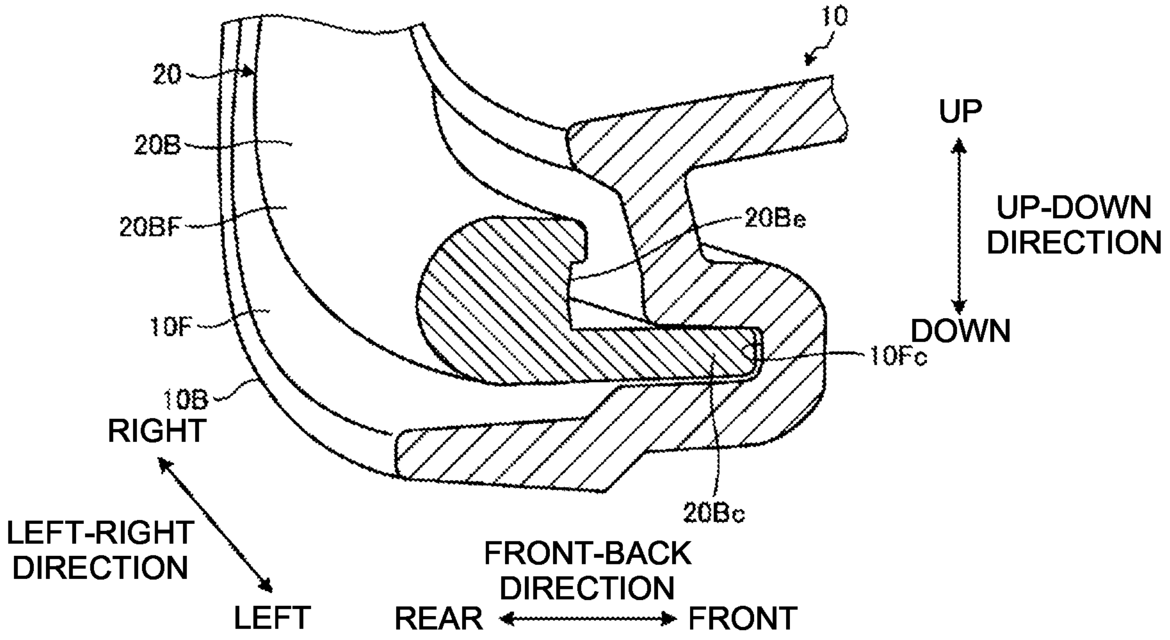
FIG. 14 is a partially enlarged perspective view of an assembled state of the housing and the light-guiding body, viewed from the front.

FIG. 9 is a partially enlarged cross-sectional view of an assembled state of the housing and the light-guiding body. FIG. 10 is a partially enlarged perspective view of an assembled state of the housing and the light-guiding body, viewed from the front. FIG. 11 is a partially enlarged perspective view of an assembled state of the housing and the light-guiding body, viewed from the back. FIG. 12 is a partially enlarged perspective view of the housing viewed from the front. FIG. 13 is a partially enlarged perspective view of an assembled state of the housing and the light-guiding body, viewed from the front. FIG. 14 is a partially enlarged perspective view of an assembled state of the housing and the light-guiding body, viewed from the front.

In the vehicle lamp 100 configured as described above, the housing 10, the light-guiding body 20, and the light source 30 are assembled.

To attach the light-guiding body 20 to the housing 10, as shown in FIG. 9, the rear surface 20Dc (incident surface) of the rear light-guiding portion 20D in the light-guiding body 20 faces backward and is inserted from the front into the hole 10Ga of the cylinder 10G in the housing 10. When the rear light-guiding portion 20D is inserted into the hole 10Ga of the cylinder 10G, the engagement protrusion 20Da of the rear light-guiding portion 20D eventually fits into the engagement recess 10Gb of the hole 10Ga, and the locking surface 20Daa of the engagement protrusion 20Da and the locking surface 10Gba of the engagement recess 10Gb face each other in the front-back direction. Consequently, the light-guiding body 20 is restricted from moving to the front in the front-back direction relative to the housing 10 by the locking surfaces 10Gba and 20Daa.

When the engagement protrusion 20Da of the rear light-guiding portion 20D fits into the engagement recess 10Gb of the hole 10Ga, the elastic portion 10Gc of the cylinder 10G comes into contact with the lower outer surface of the rear light-guiding portion 20D, elastic force for bending the elastic portion 10Gc downward and returning the elastic portion 10Gc upward is generated, and the rear light-guiding portion 20D is pushed upward by this elastic force. Consequently, the light-guiding body 20 is restricted from moving downward in the vertical direction relative to the housing 10, and the engagement state in which the engagement protrusion 20Da is fitted into the engagement recess 10Gb is maintained, and therefore the restriction of movement to the front in the front-back direction by the locking surfaces 10Gba and 20Daa is maintained.

When the engagement protrusion 20Da of the rear light-guiding portion 20D fits into the engagement recess 10Gb of the hole 10Ga, the respective protruding portions 10Gd of the cylinder 10G come into contact with the left and right outer peripheral surfaces of the rear light-guiding portion 20D, as illustrated in FIG. 10. That is, the cylinder 10G and the rear light-guiding portion 20D are brought into contact with each other with the projections 10Gd therebetween in the left-right direction. Consequently, the light-guiding body 20 is restricted from moving in both sides in the left and right directions relative to the housing 10.

As illustrated in FIG. 9, after the light-guiding body 20 is attached to the housing 10, or before the light-guiding body 20 is attached to the housing 10, a base plate 40 with the light source 30 is attached to the housing 10. The base plate 40 is positioned on the rear portion 10D from the back side, and fixed to the rear portion 10D by screws or other screw fixation such that the pins 10Da of the rear portion 10D in the housing 10 are inserted into the through holes 40B. When the engagement protrusion 20Da of the rear light-guiding portion 20D fits into the engagement recess 10Gb of the hole 10Ga, the protrusion portion 20Db of the rear light-guiding portion 20D comes into contact with and abuts on the plate surface 40A of the base plate 40. Consequently, the light-guiding body 20 is restricted from moving to the back side in the front-back direction relative to the housing 10, and the distance between the rear surface 20Dc of the rear light-guiding portion 20D and the light source 30 is optimized.

In the housing 10, in addition to the main configuration having the upper portion 10A, the lower portion 10B, the central portion 10C, and the rear portion 10D described above, a second housing 10H which is a secondary configuration is fixed to the right side of the rear portion 10D by screws of other screw fixation, as illustrated in FIG. 11. This second housing 10H is formed with a restriction portion 10Ha that comes into contact with the elastic portion 10Gc from the lower side in the vertical direction in a state in which the second housing 10H is fixed to the housing 10. The restriction portion 10Ha is formed as a bar-shaped member having an L-shaped cross-section extending from the second housing 10H to the left side, and ensures rigidity. Therefore, the elastic portion 10Gc of the cylinder 10G is restricted from returning to the lower side by the restriction portion 10Ha. Consequently, the light-guiding body 20 maintains the restriction of downward movement by the elastic portion 10Gc, and therefore the engagement state in which the engagement protrusion 20Da is fitted into the engagement recess 10Gb is maintained, and the restriction of movement to the front side in the front-back direction by the locking surfaces 10Gba and 20Daa is maintained.

After attaching the rear light-guiding portion 20D of the light-guiding body 20 to the cylinder 10G of the housing 10, as illustrated in FIG. 12, and FIG. 13, the lower light-guiding portion 20B in the light-guiding body 20 is bent and the left end 20Bb is inserted and fitted into the hole portion 10Bc formed in the left end 10Bb of the lower portion 10B in the housing 10. When the left end Bb of the lower light-guiding portion 20B fits into the hole portion 10Bc of the lower portion 10B, the lower light-guiding portion 20B fits into the lower groove 10F of the lower portion 10B. When the lower light-guiding portion 20B fits into the lower groove 10F, the protrusion 20Bc of the lower light-guiding portion 20B is inserted into the recess 10Ec formed in the lower groove 10F of the lower portion 10B, as illustrated in FIG. 14. Similarly, although not explicitly illustrated in the figure, after the rear light-guiding portion 20D of the light-guiding body 20 is attached to the cylinder 10G of the housing 10, the upper light-guiding portion 20A in the light-guiding body 20 is bent and the left end 20Ab is inserted and fitted into the hole portion 10Ac formed in the left end 10Ab of the upper portion 10A in the housing 10. When the left end 20Ab of the upper light-guiding portion 20A fits into the hole portion 10Ac of the upper portion 10A, the upper light-guiding portion 20A fits into the upper groove 10E of the upper portion 10A. When the upper light-guiding portion 20A fits into the upper groove 10E, the protrusion 20Ac of the upper light-guiding portion 20A is inserted into the recess 10Ec formed in the upper groove 10E of the upper portion 10A.

Thus, the housing 10, the light-guiding body 20, and the light source 30 are assembled to configure the vehicle lamp 100. In the vehicle lamp 100, light from the light source 30 is incident from the rear surface 20Dc of the rear light-guiding portion 20D in the light-guiding body 20 and is branched and guided to the upper light-guiding portion 20A and the lower light-guiding portion 20B. In the upper light-guiding portion 20A, light guided into the upper light-guiding portion 20A is reflected toward the front surface 20Af of the upper light-guiding portion 20A by the prism portion 20Ae, and this front surface 20Af emits light. On the other hand, in the lower light-guiding portion 20B, light guided into the lower light-guiding portion 20B is reflected toward the front surface 20Bf of the lower light-guiding portion 20B by the prism portion 20Be, and this front surface 20Bf emits light.

In the embodiment described above, the light-guiding body 20 has a configuration in which the upper light-guiding portion 20A and the lower light-guiding portion 20B extends from the rear light-guiding portion 20D in a forked shape, but may also have a configuration in which only an upper light-guiding portion 20A extends from a rear light-guiding portion 20D, or only a lower light-guiding portion 20B extends from a rear light-guiding portion 20D. The housing 10 includes an upper portion 10A having an upper groove 10E into which the upper light-guiding portion 20A fits when the housing 10 has the configuration in which only the upper light-guiding portion 20A extends from the rear light-guiding portion 20D. The housing 10 includes a lower portion 10B having a lower groove 10F into which the lower light-guiding portion 20B fits when the housing 10 has the configuration in which only the lower light-guiding portion 20B extends from the rear light-guiding portion 20D.

Thus, the light-guiding body fixation structure of the embodiment includes: the housing 10 as a fixation portion that has a first holding portion (cylinder 10G) for holding one end portion (rear light-guiding portion 20D) of the continuous light-guiding body 20, and a second holding portion (the hole portion 10Ac of the upper portion 10A and/or the hole portion 10Bc of the lower portion 10B) for holding the other end portion (the left end 20Ab of the upper light-guiding portion 20A and/or the left end 20Bb of the lower light-guiding portion 20B) of the light-guiding body 20; engagement portions (the engagement recess 10Gb and the engagement protrusion 20Da) that restrict movement of the one end portion to one side in the first direction (the front side in the front-back direction) by mutual engagement between the first holding portion and the one end portion; the elastic portion 10Gc that generates elastic force to one side in the second direction (the upper side in the vertical direction) which intersects the first direction, and that abuts on the one end portion to maintain engagement of the engagement portions; contact portions (projections 10Gd) that bring the first holding portion and the one end portion into contact with each other on both sides in the third direction (left-right direction) which intersects the first direction and the second direction in an engagement state of the engagement portions; an abutment portion (base plate 40) that abuts on the one end portion to restrict movement of the one end portion to the other side in the first direction (the back side in the front-back direction); and the restriction portion 10Ha that abuts on the elastic portion 10Gc to restrict movement of the elastic portion 10Gc to the other side in the second direction (the lower side in the vertical direction).

Therefore, the light-guiding body fixation structure of the embodiment holds the one end portion of the continuous light-guiding body 20 against the first holding portion of the housing 10 while restricting the frontward, backward, upward, downward, leftward and rightward movement, and holds the other end portion against the second holding portion of the housing 10. Thus, the light-guiding body fixation structure of the embodiment holds the one end portion and the other end portion by restricting the frontward, backward, upward, downward, leftward and rightward movement of the light-guiding body 20, without using screws or other screw fixation. As a result, according to the light-guiding body fixation structure of the embodiment, it is possible to hold the one end portion and the other end portion of the light-guiding body 20 and fix the light-guiding body 20 to the housing 10 without using screws or other screw fixation in the middle of the light-guiding body 20 or at the one end portion and the other end portion, so that it is possible to prevent point illumination, and fix the light-guiding body 20 to the housing 10.

In the light-guiding body fixation structure of the embodiment, the light-guiding body 20 has the protrusions 20Ac and 20Bc partially on the second side surfaces (rear surfaces 20Ad, 20Bd) opposite to the first side surface (the front surface 20Af of the upper light-guiding portion 20A and/or the front surface 20Bf of the lower light-guiding portion 20B) which emit light, and the housing 10 has the recesses 10Ec, 10Fc into which the protrusions are inserted.

Therefore, in the light-guiding body fixation structure of the embodiment, the protrusions 20Ac and 20Bc of the light-guiding body 20 are inserted into the recesses 10Ec and 10Fc of the housing 10, so that the light-guiding body 20 is held in the housing 10. The protrusions 20Ac and 20Bc are provided on the second side surfaces opposite to the first side surfaces where the light-guiding body 20 emits light, and therefore the light-guiding body 20 can be held in the housing 10 while suppressing point illumination. As a result, according to the light-guiding body fixation structure of the embodiment, it is possible to prevent point illumination and fix the light-guiding body 20 to the housing 10. The protrusions 20Ac and 20Bc are each preferably formed in a straight shape portion or a portion which approximates a straight shape, between the one end portion and the other end portion of the light-guiding body 20. When the protrusions 20Ac and 20Bc are each provided in a curved shape portion, the protrusions 20Ac and 20Bc may affect reflection by the prism portions 20Ae and 20Be formed on the second surface of the light-guiding body 20, and the light-guiding body fixation structure of the embodiment can prevent this.

Figure 15:
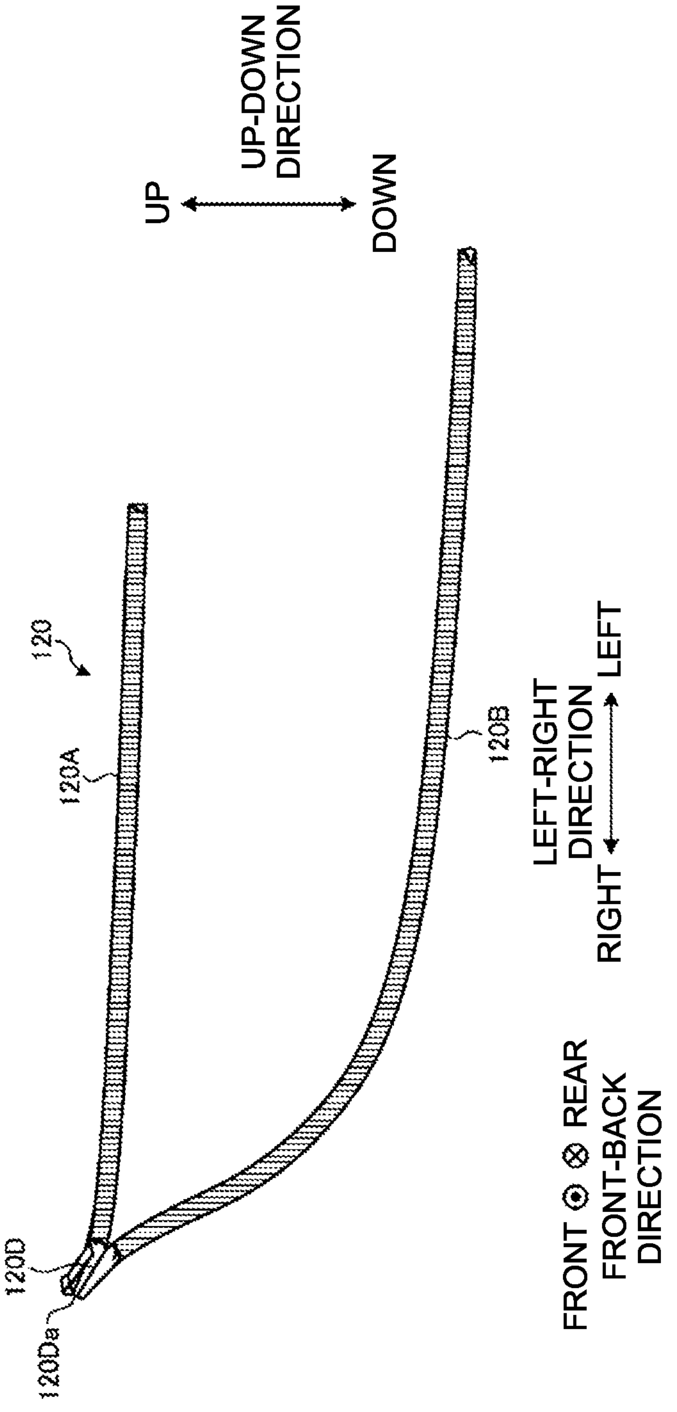
FIG. 15 is a front view of the light-guiding body.

FIG. 15 is a front view of the light-guiding body. A light-guiding body 120 illustrated in FIG. 15 is a member similar to the light-guiding body 20. The light-guiding body 120 has an upper light-guiding portion 120A, a lower light-guiding portion 120B, and a rear light-guiding portion 120D. The upper light-guiding portion 120A, and the lower light-guiding portion 120B have similar configurations and functions to the upper light-guiding portion 20A and the lower light-guiding portion 20B. The rear light-guiding portion 120D extends backward from a right end where the upper light-guiding portion 120A and the lower light-guiding portion 120B are mutually connected. As described above, in the rear light-guiding portion 120D, the light source is disposed so as to face an end surface 120Da. Light output from the light source is incident on the light-guiding body 120 from the end surface 120Da, and the incident light passes through the rear light-guiding portion 120D and is branched into the upper light-guiding portion 120A and the lower light-guiding portion 120B. Consequently, in the light-guiding body 120, the light incident from the one end surface 120Da is guided to both the upper light-guiding portion 120A and the lower light-guiding portion 120B, and is emitted from ejection surfaces of the upper light-guiding portion 120A and the lower light-guiding portion 120B. Thus, when the light-guiding bodies 20 and 120 each has a configuration in which the upper light-guiding portion 20A, 120*a* and the lower light-guiding portion 20B, 120B extend from the rear light-guiding portion 20D, 120D in a forked shape, and light is guided to a plurality of linear light-guiding portions from a single incident surface, the light-guiding body can be suitably fixed.

In the light-guiding body fixation structure of the embodiment, the second holding portion is formed by the hole portion 10Ac, 10Bc into which the other end portion of the light-guiding body 20 is inserted.

Therefore, according to the light-guiding body fixation structure of the embodiment, the other end portion of the light-guiding body 20 can be held without using screws or other screw fixation by inserting and fitting the other end portion of the light-guiding body 20 into the hole portion 10Ac, 10Bc, so that it is possible to prevent point illumination, and fix the light-guiding body 20 to the housing 10.

In the light-guiding body fixation structure of the embodiment, the abutment portion is the base plate 40 mounted with the light source 30 that causes light to be incident from the one end portion of the light-guiding body 20.

Therefore, according to the light-guiding body fixation structure of the embodiment, the base plate 40 constitutes the abutment portion, and therefore it is possible to fix the light-guiding body 20 to the housing 10 without increasing the number of components.

The vehicle lamp 100 of the embodiment includes: the light-guiding body 20 that is continuous between the one end portion and the other end portion; the light source 30 that causes light to be incident from the one end portion of the light-guiding body 20; and the housing 10 to which the light-guiding body 20 and the light source 30 are attached, and the light-guiding body 20 is fixed to the housing 10 by the above light-guiding body fixation structure.

Therefore, in the vehicle lamp 100 of the embodiment, it is possible to prevent point illumination, and the light-guiding body 20 can be fixed.

DESCRIPTION OF REFERENCE NUMERALS

10 . . . housing (fixation portion)
10Ac, 10Bc . . . hole portion (second holding portion)
10Ec, 10Fc . . . recess
10G . . . cylinder (first holding portion)
10Gb . . . engagement recess (engagement portion)
10Gc . . . elastic portion
10Gd . . . projection (contact portion)
10Ha . . . restriction portion
20, 120 . . . light-guiding body
20Ab, 20Bb . . . left end (other end portion)
20Ac, 20Bc . . . protrusion
20Ad, 20Bd . . . rear surface (second side surface)
20Af, 20Bf . . . front surface (first side surface)
20D . . . rear light-guiding portion (one end portion)
20Da . . . engagement protrusion (engagement portion)
30 . . . light source
40 . . . base plate (abutment portion)
100 . . . vehicle lamp

The invention claimed is:

1. A light-guiding body fixation structure comprising:

a fixation portion that has a first holding portion for holding one end portion of a continuous light-guiding body, and a second holding portion holding the other end portion of the light-guiding body;

engagement portions that restrict movement of the one end portion to one side in a first direction by mutual engagement between the first holding portion and the one end portion;

an elastic portion that generates elastic force to one side in a second direction which intersects the first direction, and that abuts on the one end portion to maintain engagement of the engagement portions;

contact portions that bring the first holding portion and the one end portion into contact with each other on both sides in a third direction which intersects the first direction and the second direction in an engagement state of the engagement portions;

an abutment portion that abuts on the one end portion to restrict movement of the one end portion to the other side in the first direction; and a restriction portion that abuts on the elastic portion to restrict movement of the elastic portion to the other side in the second direction.

2. The light-guiding body fixation structure according to claim 1, wherein the light-guiding body has a protrusion partially on a second side surface opposite to a first side surface which emits light, and the fixation portion has a recess into which the protrusion is inserted.

3. The light-guiding body fixation structure according to claim 1, wherein the second holding portion is formed by a hole portion into which the other end portion of the light-guiding body is inserted and fitted.

4. The light-guiding body fixation structure according to claim 1, wherein the abutment portion is a base plate mounted with a light source that causes light to be incident from the one end portion of the light-guiding body.

5. A vehicle lamp comprising:

a light-guiding body that is continuous between one end portion and the other end portion;

a light source that causes light to be incident from the one end portion of the light-guiding body; and a fixation portion to which the light-guiding body and the light source are attached, wherein the light-guiding body is fixed to the fixation portion by the light-guiding body fixation structure according to claim 1.

* * * * *